United States Patent
Guven

(10) Patent No.: US 8,351,590 B2
(45) Date of Patent: Jan. 8, 2013

(54) SELECTIVE CALL REJECT FEATURE FOR A TELEPHONE

(75) Inventor: Mesut Guven, Allen, TX (US)

(73) Assignee: Metropcs Wireless, Inc., Richardson, TX (US)

(*) Notice: Subject to any disclaimer, the term of this patent is extended or adjusted under 35 U.S.C. 154(b) by 1230 days.

(21) Appl. No.: 11/834,786

(22) Filed: Aug. 7, 2007

(65) Prior Publication Data

US 2009/0041222 A1 Feb. 12, 2009

(51) Int. Cl.
 *H04M 3/42* (2006.01)

(52) U.S. Cl. ......... 379/210.02; 379/211.01; 379/201.01; 379/207.15

(58) Field of Classification Search .............. 379/210.02, 379/211.01, 201.01, 207.15
See application file for complete search history.

(56) References Cited

U.S. PATENT DOCUMENTS

| | | | |
|---|---|---|---|
| 5,388,150 A | 2/1995 | Schneyer et al. | |
| 5,454,033 A * | 9/1995 | Hahn et al. | 379/198 |
| 5,467,388 A | 11/1995 | Redd, Jr. et al. | |
| 6,456,706 B1 | 9/2002 | Blood et al. | |
| 6,654,452 B1 | 11/2003 | Murray et al. | |
| 6,690,784 B2 | 2/2004 | Renner et al. | |
| 6,701,160 B1 | 3/2004 | Pinder et al. | |
| 7,046,782 B2 * | 5/2006 | Miller | 379/207.14 |
| 7,336,975 B2 | 2/2008 | Morota et al. | |
| 2004/0008621 A1 * | 1/2004 | Yaker | 370/221 |
| 2005/0185784 A1 * | 8/2005 | Chiu et al. | 379/210.02 |
| 2005/0239482 A1 * | 10/2005 | Fan et al. | 455/456.4 |
| 2006/0050858 A1 | 3/2006 | Smith | |
| 2007/0238449 A1 * | 10/2007 | Park et al. | 455/417 |

OTHER PUBLICATIONS

PCT: International Search Report of PCT/US2008/072488; International Publication No. WO 2009/021120; Feb. 26, 2009; 3 pgs.
PCT: Written Opinion of the International Searching Authority of PCT/US2008/072488; International Publication No. WO 2009/021120; Feb. 26, 2009; 4 pgs.
PCT: International Preliminary Report on Patentability of PCT/US2008/072488 (counterpart application); Feb. 9, 2010; 5 pgs.
SPB Software House, "Spb Phone Suite User Manual," 2008.

* cited by examiner

*Primary Examiner* — Quynh Nguyen
(74) *Attorney, Agent, or Firm* — Howison & Arnott, L.L.P.

(57) ABSTRACT

A telephone includes first circuitry enabling communications with a telephone network. A call block list includes at least one user designated number. A call blocking logic module is implemented within the first circuitry and selectively blocks incoming calls to the telephone over the telephone network responsive to the at least one user designated number in the call block list.

29 Claims, 4 Drawing Sheets

SELECTIVE CALL REJECT FEATURE FOR A TELEPHONE

TECHNICAL FIELD

The present invention relates to call blocking features utilized within a telephone, and more particularly, to a selective call blocking feature that is implemented within the telephone rather than on the network side.

BACKGROUND

Presently, both wireless and wireline telephones provide limited options with respect to call blocking features. Most of these systems operate wherein the call blocking aspect is controlled on the network side of the system and when a particular number on a call block list is directed to the telephone, the network switching circuitry does not direct the call to the telephone. Within wireless systems some additional functionalities exist wherein the handsets are able to block all calls directed to the handset but is not selectively able to block calls from specified numbers. This feature is available in some CDMA and GSM type telephone handsets.

Since all call blocking features must be implemented through the network or require the blocking of all calls to a particular telephone, a user does not have a great deal of flexibility in deciding which, if any, calls to block to their telephone nor can they control blocking of the variety of calling features that are available in today's wireless systems such as text messaging, instant messaging, pictures, video and many other types of media that may be transmitted to a user's wireless handset from a variety of calling numbers. Thus, there is a need for providing a user with a greater flexibility of control in blocking calls made to their telephone and is presently available within existing telephones and telecommunications systems.

SUMMARY

The present disclosure, as disclosed and described herein, in one embodiment thereof comprises a telephone. The telephone includes first circuitry enabling communications with the telephone network. The telephone further includes a call block list including at least one user designated number. A call blocking logic module implemented within the first circuitry selectively blocks incoming calls to the telephone over the telephone network responsive to the at least one user designated number in the call block list.

BRIEF DESCRIPTION OF THE DRAWINGS

For a more complete understanding of the present disclosure and the advantages thereof, reference is now made to the following description taken in conjunction with the accompanying Drawings in which.

DETAILED DESCRIPTION

Figure 1:
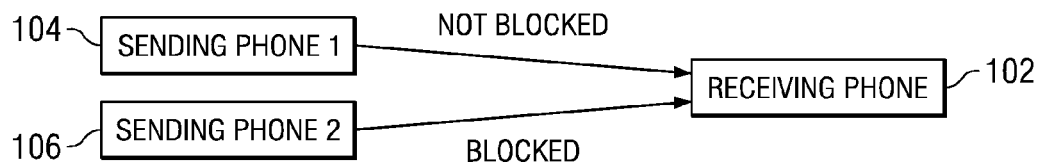
FIG. 1 illustrates the manner in which calls may be selectively blocked when being transmitted from one telephone to another telephone.

Referring now to the drawings, wherein like reference numbers are used herein to designate like elements throughout the various views, embodiments of the present disclosure are illustrated and described, and other possible embodiments of the present disclosure are described. The figures are not necessarily drawn to scale, and in some instances the drawings have been exaggerated and/or simplified in places for illustrative purposes only. One of ordinary skill in the art will appreciate the many possible applications and variations of the present disclosure based on the following examples of possible embodiments.

Referring now to the drawings, and more particularly to FIG. 1, there is provided a general illustration of the manner in which a telephone 102 receiving a call from various sending phones 104 and 106 may selectively control the manner in which calls are blocked (or rejected) to the receiving telephone 102. As can be seen in FIG. 1, the receiving phone 102 has been programmed to block a call from phone 106 but not to block calls from phone 104. Thus, if phone 104 dialed a number of receiving phone 102 the call would be completed to the receiving phone 102. On the other hand, a call initiated from sending phone 106 would be blocked by receiving phone 102, and the call would not be passed through. In addition to preventing voice call completion between the sending phones 104 and 106 and the receiving phone 102, the call blocking functionalities will enable other types of data transfers to be selectively blocked to the receiving phone 102. These may include for example text messaging, instant messaging, video data, picture data or any other types of data transfers between the sending phones 104, 106 and the receiving phone 102 that may be uniquely identified according to the sending phone when received by the receiving phone 102.

A further advantage of the receiving phone 102 including the described call blocking functionalities is that the call is actually forwarded by the wireless or wireline network to the receiving phone 102 and a decision on whether or not to block the call is made not by the network but by the receiving phone 102. Thus, the call is completed to the receiving phone by the wireless or wireline network, but the receiving phone will not ring the call through or display information responsive to receipt of the call if the call is placed within the blocking or rejection feature of the receiving phone 102.

Figure 2:
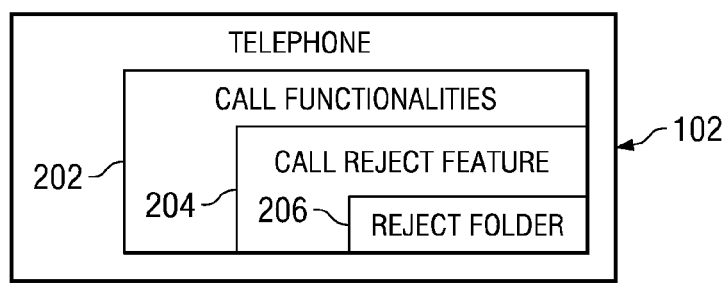
FIG. 2 illustrates a telephone including the selective call reject/block feature of the present disclosure.

Referring now to FIG. 2, there is illustrated the telephone 102 including a number of call functionalities 202 providing the telephone 102 with its various operating characteristics. The telephone 202 also includes various circuitries enabling the telephone to communicate with a wireless or wireline network. Included within the call functionalities 202 is the call reject feature (or block feature) 204 providing the ability to block various types of incoming calls. The call reject feature 204 is implemented within the software of the telephone 102 thus enabling the user to uniquely configure their telephone 102 to block calls in almost any desired fashion. The telephone 102 in a preferred embodiment would be a wireless handset system used within a wireless telecommunications system. However, nothing would prevent the selective call reject feature 204 from being implemented in wireline telephones as the information received by both wireline and wireless telephones are similar with respect to the information that is used to make a determination as to whether or not to block an incoming call at the receiving telephone 102.

The selective call reject feature 204 upon receiving an incoming call, voice, text or picture, prompts the user with the option to move the incoming caller's ID consisting of their MDN (mobile identification number) into a reject folder 206. Once stored within the reject folder 206, the user is able to assign a level of rejection that they would like to set for this number. It can choose to block all incoming voice, text and/or picture messages from the number or any subset thereof. Additionally, rather than storing numbers within the reject folder 206 upon their receipt with an incoming call the user can add numbers to the reject folder 206 at any time by merely entering the number through the graphical user interface of the telephone 102.

The call reject feature 204 additionally includes the ability to circumvent situations wherein the calling party has blocked presentation of their caller ID. The call reject feature 204 shall have the ability to reject these types of incoming calls by a generic setting in the reject folder 206 based upon information contained within the "presentation indicator" field. This will be more fully described below. The reject folder 206 shall include enough memory storage to store a large number of telephone numbers and have the ability to set the level of rejection/blocking for each number independently. In addition to blocking outgoing calls, the call reject feature 204 will provide the ability to block outgoing calls, text messages and or picture messages to numbers stored within the reject folder 206. Thus, for example, if a parent wished to prevent a child from calling certain numbers from their telephone or the home telephone, this number could be blocked from sending outgoing calls or messages from a particular telephone or telephones 102.

Figure 3:
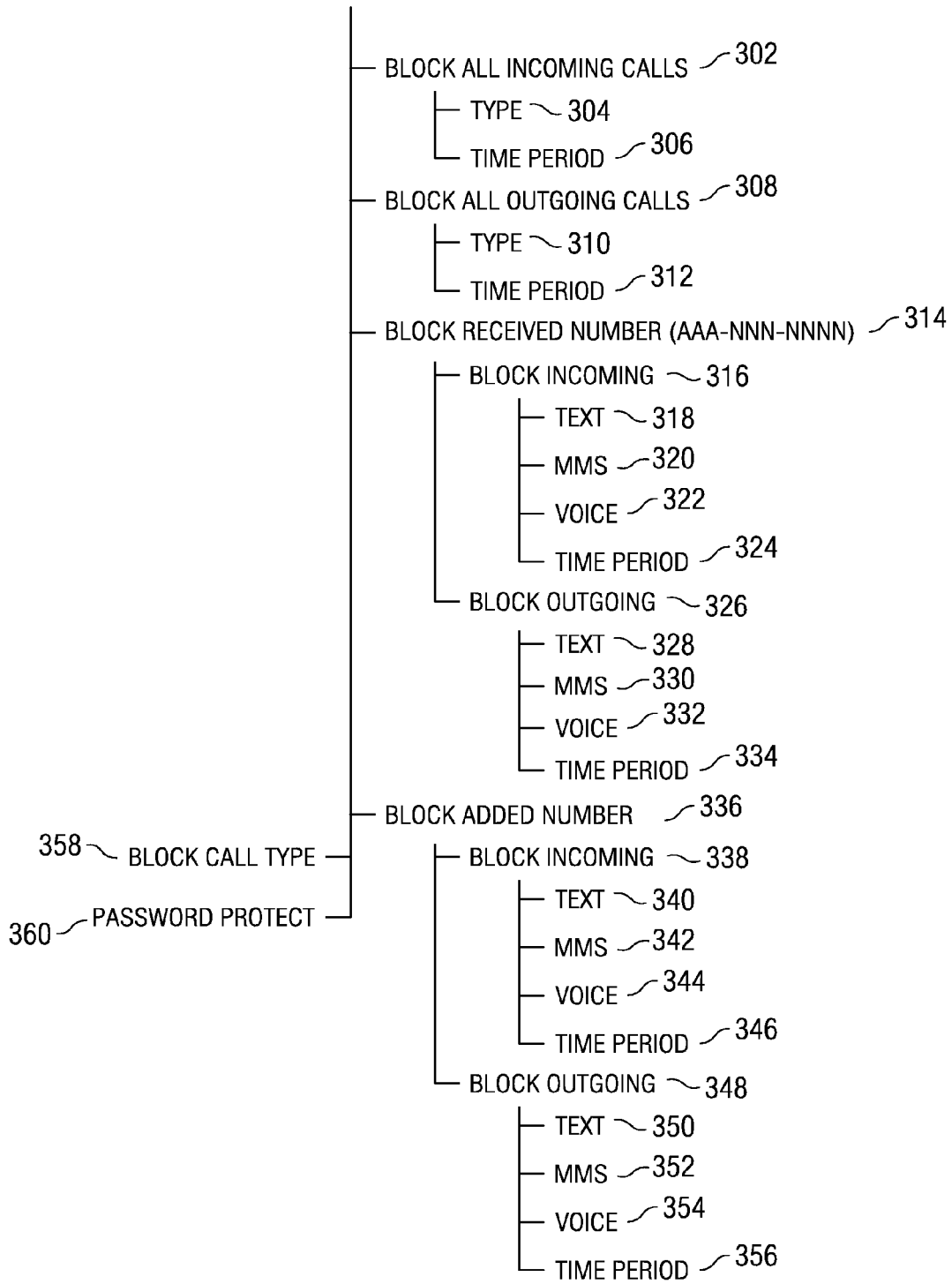
FIG. 3 illustrates the manner in which the blocked call folder may be used to control the manner in which calls are selectively blocked to the telephone.

Referring now to FIG. 3, there is illustrated a control tree structure for the various functionalities and features associated with the call reject feature 204. Other control structures are also applicable. The call reject feature 204 includes a first option to enable the blocking of all incoming calls. The block all incoming calls feature 302 may be further modified by a type feature 304 enabling the user to selectively choose the type of incoming call that is to be completely blocked from the telephone. The user could prevent the receipt of text messages, picture messages, voice messages, MMS messages or other types of messages that can be identified. The time period feature 306 to allow the user to select a particular period of time for which all incoming calls would be blocked. For example, the telephone could be programmed to prevent the receipt of all incoming calls during a particular time of day such as during school hours, during a regularly scheduled meeting of the user, or during the lunch hour of the user. This would prevent the user from receiving calls during this time period on a regular basis and not require the option of turning off the phone or putting the phone on silent or vibrate mode to prevent interruption of the user during these times.

The block all outgoing calls feature 308 enables a user to block all calls outgoing from the telephone. The type feature 310 enable the user to selectively choose the outgoing calls that are blocked by types such as voice, text, picture, MMS, etc. The time period feature 312 enables the user to block all outgoing calls for selected time periods during a day or over any desired period of time. The block all outgoing calls feature would not block outgoing calls to emergency numbers such as 911. Emergency calls would always be allowed from the phone.

The block received number feature 314 enables the user to designate a particularly received call number to be blocked when the call is received on their telephone. Thus, upon receipt of a call from a particular number that the user wishes to block, the block received number feature 314 enables the user to block all incoming calls from this number using feature selection 316. The blocking of the incoming call may then be specifically limited to any/all text information 318 from this number, MMS information 320 from this number or voice calls 322 from this number. Other types of received messages may also be blocked as they can be identified by the incoming/outgoing call information. Also, the user may establish various time periods 324 for blocking incoming calls from this particular number. Similarly, the block outgoing feature 336 of the block received number feature 314 may be used to block outgoing calls to the received number. The user may block text messages to this number 328, may block MMS messages to this number 330, and voice calls 332 to this number. Other types of received messages may also be blocked as they can be identified by the incoming/outgoing call information. The user may also control the time period 334 during a day, week, month, etc., that outgoing calls to this number are blocked.

The block added number feature 336 enables a user to enter via the graphical user interface a particular number that they desire to block calls to and from. This would enable the user to block a call without first receiving a call from a number before enabling blocking calls to/from that number. The block added number feature 336 includes a block incoming feature 338 enabling the blocking of incoming class from the added number, and a block outgoing feature 348 enabling the blocking of outgoing calls to the added number. The block incoming feature 338 enables the blocking of text messages 340, MMS messages 342 and voice calls 344. Other types of received messages may also be blocked as they can be identified by the incoming/outgoing call information. Other types of received messages may also be blocked as they can be identified by the incoming/outgoing call information. The time period feature 346 enables the user to select particular periods of time during which incoming calls from the added number are blocked. The block outgoing feature 348 also allows the blocking of text messages 350, MMS messages 352, and voice calls 354 to the designated number. The time period feature 356 allows the user to select a period of time during which the outgoing calls are being blocked.

Figure 4:
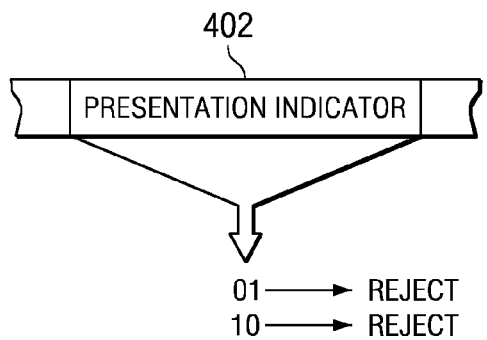
FIG. 4 illustrates the manner in which the presentation indicator field of a call may be used to selectively reject calls of a particular type.

The block call type feature 358 enables the blocking of calls from calling numbers that have blocked their caller identification number from the receiving number. Many times telemarketers and other types of calling entities will block their caller ID to prevent a user from visually screening the answering of calls based upon the caller ID feature available upon many telephones. The block call type feature 358 enables the receiving telephone to block incoming calls based upon information contained within the presentation indicator field 402 as illustrated in FIG. 4. The presentation indicator field 402 is included within a received incoming call message. The presentation indicator 402 is a two bit parameter that is included within the Alert With Information message or the Flash With Information message as specified within the CDMA2000 standard during call setup. For data calls using SMS or MMS, the caller ID may be embedded in other locations within the messaging rather than in the Alert With Information or Flash With Information messages. It would be realized by one skilled in the art that other types of information contained within incoming calls indicating that an originating caller has blocked presentation of their caller ID or other types of messaging formats indicating the originating caller has blocked presentation of the caller ID could also be used as indicators within wireless standards or within wireline standards to block calls from calling parties blocking their caller ID.

The block call type feature 358 would enable the call rejection feature 204 to reject all calls including particular types of presentation indicators. These include a presentation indicator identified by the two bit code "01." This "01" code is an indication that presentation of the caller ID is restricted. This is normally the case where the originating caller has opted to block their caller ID from the receiving caller. An additional presentation indicator which may be blocked is for the two bit logic code "10." This code provides an indication that the number is not available. Rejection of calls based upon the unavailability or blocked caller ID is not exclusive to the presentation indicator field provided by the CDMA2000 standard. The same principles can be applied to all situations where no caller ID is presented during the receiving of an incoming call.

A password protect feature 360 enables a user to lock the settings of the call rejection feature 204 with a lock code that is known only to the user. Entry of this code would be required to enable the user to change blocked incoming and outgoing call numbers that have previously been set by the call rejection feature 204. This feature would be very useful as a parental control function to prevent a child from changing blocked numbers that have been established by a parent once the password protect feature is implemented.

Figure 5:
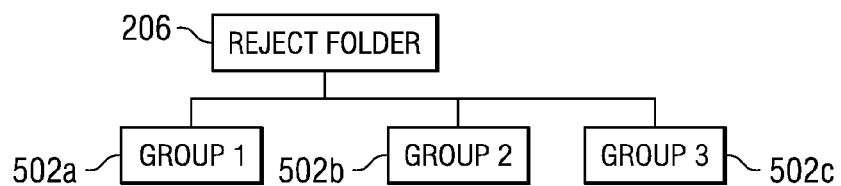
FIG. 5 illustrates the manner in which the call reject folder may include various subgroup folders there within.

Referring to FIG. 5, there is illustrated the manner in which the call reject folder 206 may have grouped therein various sub folders 502. The user has the ability to create and name sub folders 502 under the reject folder 206 in order to group rejected numbers into different categories. Thus, if particular groups of rejected or blocked calls are all to be treated in a similar fashion they may be grouped into a Group 1 502a. Similarly, a Group 2 of called numbers 502b may be associated together to manage this second group of call numbers with respect to a second group of rules. In this way, a large group of numbers to be blocked could be grouped together within a subfolder 502, and the particular blocking characteristics associated with that group established for all numbers within the subgroup 502. So, for example, all numbers within Group 3 502c could be configured to prevent instant messaging calls from being received or sent to/from those numbers. The same numbers could be located in multiple subfolders and be treated according to multiple rule sets that did not conflict with each other.

Figure 6:
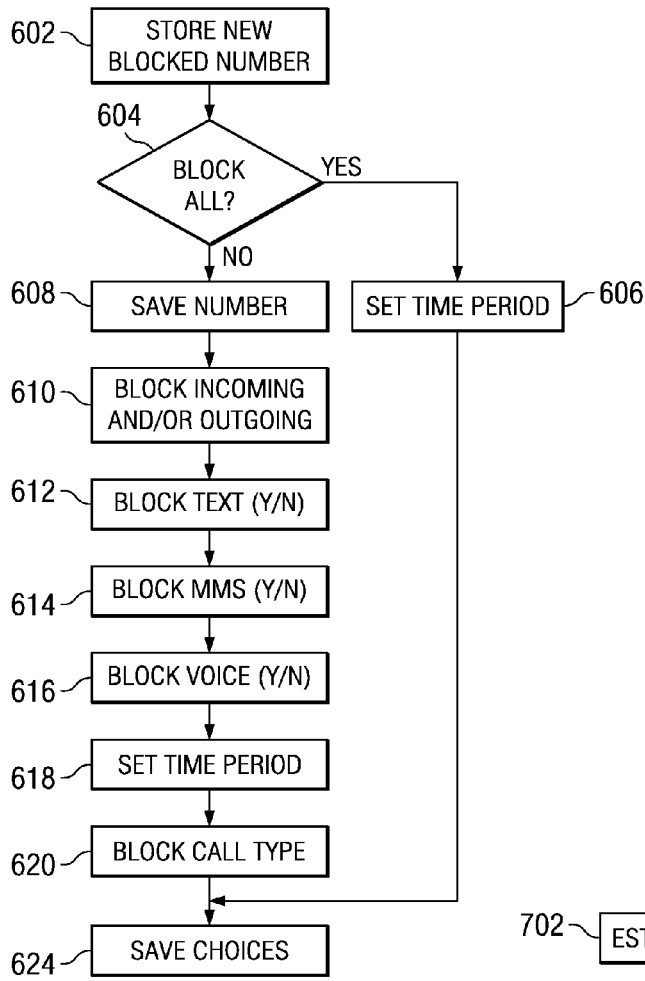
FIG. 6 is a flow diagram describing the manner in which telephone numbers may be stored within the call block folder.

Referring now to FIG. 6, there is illustrated a flow diagram describing the manner in which a number may be added to the call rejection/block folder. A newly provided number is stored within the block folder at step 602 responsive to either a user entering the number they desire to block or the user indicating they wish a received number on their telephone to be blocked. Initially at inquiry step 604 the user may indicate whether they wish to block all incoming and outgoing calls. If so, the user may establish a particular time period at step 606 that they wish all calls to be blocked or alternatively may set calls to be blocked at all times. If the user does not wish to block all incoming calls, the entered or received number is saved at step 608. The user next indicates whether they wish to block incoming calls from the number and/or outgoing calls to the number at step 610. At steps 612-616, the user indicates yes or no the types of calls they wish to block to/from the saved number. At step 612, the user indicates whether they wish to block text calls from the number, at step 614 the user indicates whether they wish to block MMS messages from the number and at step 616 the user indicates whether they wish to block voice calls to/from the number. As described previously herein above other types of data or messages to/from the number may also be blocked if such messages or data are identifiable from the incoming call information.

At step 618 the user may set various time periods for blocking the types of calls indicated previously. This time period may occur at particular times during the day, week, month, year, etc. The user may also block particular call types based upon the blocking or lack of availability of the caller ID associated with the call. Calls may be blocked as a matter of course if you are not able to determine the incoming call number from the caller ID information at step 620. All of these selections are saved at step 624 such that the telephone will operate according to the user made selections.

Figure 7:
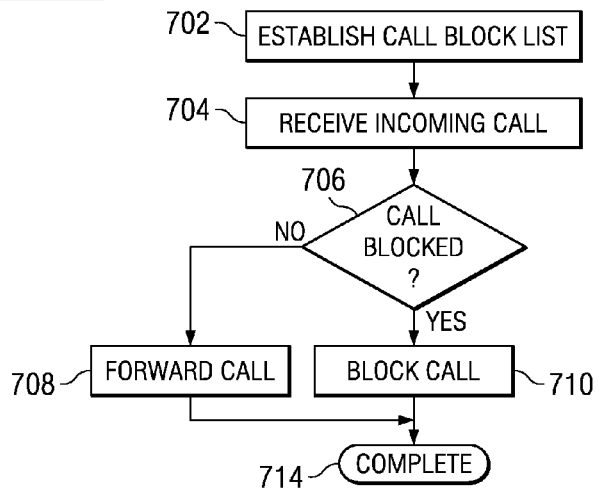
FIG. 7 is a flow diagram illustrating the manner in which a call is blocked responsive to a listing within the call block folder.

Referring now to FIG. 7, there is illustrated the manner in which the telephone 102 will operate upon receipt of a call that may or may not be included within the reject folder 206 of the call reject feature 204. As described previously, the call block list is established by the user upon their telephone at step 702 using the procedures described previously. After the list is established, an incoming call is received at step 704. The telephone 102 accesses the reject folder 206 to determine if they incoming call has been indicated as to be blocked. If not, the call is forwarded to the user at step 708 and the phone rings and/or the associated data is displayed. If the call is indicated as to be blocked, it is blocked at step 710 and the call never rings through to the telephone and/or associated data is not displayed. The process is completed at step 1714.

Figure 8:
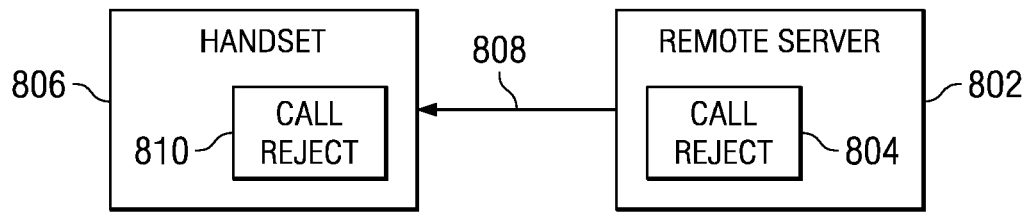
FIG. 8 illustrates a first embodiment for downloading call blocking instructions to a telephone handset.
Figure 9:
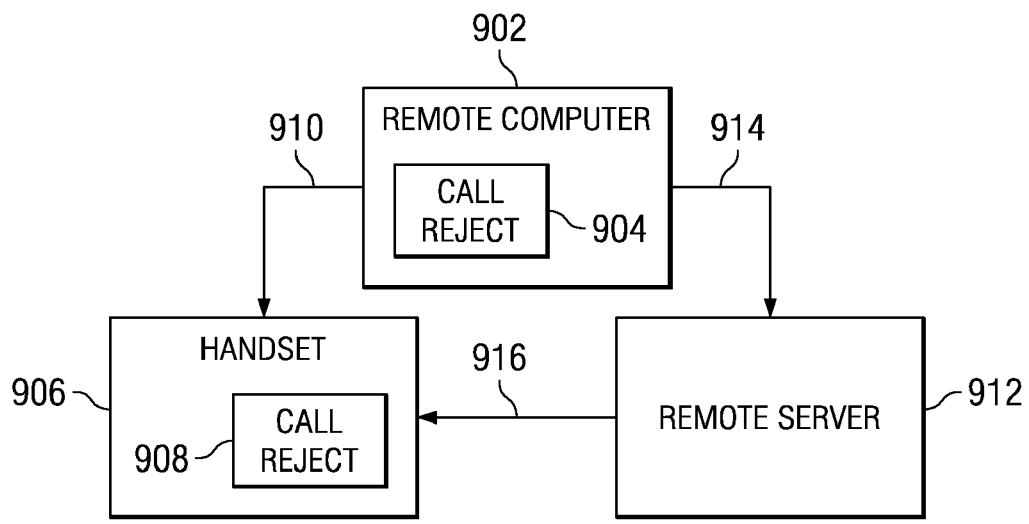
FIG. 9 illustrates a second embodiment for downloading call blocking instructions to a telephone handset.

While the foregoing description has related to a user programming the call reject folder directly through the telephone handset, the call reject feature can be programmed and downloaded remotely in the manner illustrated in FIGS. 8 and 9. Referring now to FIG. 8, there is illustrated an embodiment wherein a remote server 802 includes the call reject feature 804 functionalities implemented within the remote server 802 enabling individuals either at the remote server 802 or in contact with the remote server to establish various numbers that are to be blocked with respect to a particular handset 806 and the types of data to be blocked from said blocked numbers and the time periods that said numbers are to be blocked in accordance with the descriptions provided previously herein with respect to FIGS. 1-7. Once the various list of blocked call numbers is established using the call reject feature 804 at the remote server 802, this information is downloaded to the handset 806 via a communications link 808 to the call reject function 810 located within the handset 806. The call reject feature 810 within the handset 806 operates in the manner described previously. The communications link 808 between the remote server 802 and the handset 806 may be provided via a network such as the internet or over a local network intranet connection. Additionally, in the case of a wireline telephone the communications link 808 could be provided over the public switch telephone network.

The link 808 may also include communications over a PLMN (Public Land Mobile Network). Once the information created within the call reject function 804 at the remote server 802 is downloaded to the handset 806, the handset will reject calls from sending calls in accordance with the numbers stored within the local call reject function 810 as described previously.

Referring now to FIG. 9, rather than downloading the information from a remote server, a remote computer 902, such as a personal computer, may include the call reject functionalities 904 implemented therein. Call blocking information created within the call reject function 904 within the remote computer 902 is downloaded to a handset 906 to be loaded into the call reject function 908 located within the handset 906. The call blocking information from the remote computer 902 may be directly downloaded to the handset 906 through a first communications link 910. The communications link 910 could be over an open network such as the internet or over a local intranet network as described previously. Communications link 910 could also include a portion of a wireless network such as the public land mobile network. In the case of a wireline telephone the communications link 910 could include a portion of the public switch telephone network.

The remote computer 902 could also download the call blocking information created within the call reject function 904 to the handset 906 through a remote server 912. When downloading through the remote server 912, a first communication link 914 would be created between the remote computer 902 and the remote server 912. A second communications link 916 would be created between the remote server 912 and the handset 906. The communications links 914 and 916 may be over various wireless and wireline network connections such as the public switch telephone network and the public land mobile network and may further involve use of network connections through the internet or an intranet as described above.

Using the remote connections illustrated in FIGS. 8 and 9, a service provider may program a handset/telephone to block a desired number of calls to the handset without individually programming the handset. This would be a particular advantage in a situation wherein a user desired a particular call blocking group to operate over not just one cellular telephone or wireline telephone but desires the particular blocked numbers to be effective over all of their telephones. In this way, the user could create their call blocking profile using the call rejection function within either a remote server 802 or remote computer 902 and download this information into each of the handsets or telephones of the family to provide an integrated call blocking plan.

Thus, using the above identified functionalities within any wireless or wireline telephone, a user may have complete control over the ingoing and outgoing calls to a particular list of telephone numbers. This list of telephone numbers and the manner in which calls may be received from or sent to the numbers may be uniquely established through the telephone without requiring the implementation of complex and expensive network side processes.

It will be appreciated by those skilled in the art having the benefit of this disclosure that this invention provides a telephone having selective call blocking features. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A wireless telephone comprising:
    first circuitry enabling communications with a wireless communications network;
    a call block list including at least one user designated number, wherein the at least one user designated number of the call block list has at least one user designated call type indication associated therewith, the call type indication enabling blocking of either one of or each of a text message and voice call, wherein the at least one user designated telephone number in the call blocking list is downloaded to the call blocking list from a remote location; and
    a call blocking logic module implemented within the first circuitry for selectively blocking incoming calls from the at least one user designated number of the user designated call type to the wireless telephone over the wireless communications network responsive to the at least one user designated number in the call block list and the call type indication associated with the user designated number and for selectively blocking outgoing calls from the wireless telephone to the at least one user designated number in the call block list of the user designated call type over the wireless communications network responsive to the at least one user designated number and the call type indication, wherein the call blocking logic module blocks incoming calls based upon a code in a presentation indicator field of an incoming call.

2. The wireless telephone of claim 1, wherein the call blocking logic module further provides the ability to block all incoming calls to the wireless telephone.

3. The wireless telephone of claim 1, wherein the call blocking logic module further provides the ability to block all outgoing calls from the wireless telephone.

4. The wireless telephone of claim 1, wherein the at least one user designated number of the call block list has a user designated time period associated therewith, the user designated time period defining a selected time period during a day the at least one designated number is selectively blocked.

5. The wireless telephone of claim 4, wherein the call blocking logic module further selectively activates blocking of incoming calls to the wireless telephone over the wireless communications network responsive to the at least one user designated number in the call block list and the user designated time period during the day.

6. The wireless telephone of claim 1, wherein the call blocking logic module enables a user to store a received call number as the at least one user designated number.

7. The wireless telephone of claim 1, wherein the call blocking logic module enables a user to enter a number to store as the at least one user designated number.

8. The wireless telephone of claim 1, wherein the call blocking logic module blocks incoming calls having a caller ID of the incoming call blocked from the telephone.

9. The wireless telephone of claim 1, wherein the at least one user designated number of the call block list is password protected.

10. The wireless telephone of claim 9, wherein the call blocking logic module further enables information associated with the at least one user designated number to be changed responsive to entry of the password.

11. A wireless telephone comprising:
    first circuitry enabling communications with a wireless communications network;
    a call block list including at least one user designated number, wherein the at least one user designated number of the call block list has at least one user designated call type indication associated therewith, the call type indication enabling blocking of any combination of and any one of a text message, an MMS message and a voice call, further wherein the at least one user designated number of the call block list has a user designated time period during a day associated therewith, the user designated time period defining a selected time period during the day that the at least one designated number type is selectively blocked, wherein the at least one telephone number, the at least one user designated call type and the user designated time in the call blocking list are downloaded to the call blocking list from a remote location; and a call blocking logic module implemented within the first circuitry for selectively activating blocking of incoming calls to the user designated number of the designated call type to the wireless telephone over the wireless communications network responsive to the at least one user designated number in the call block list, the designated call type indication associated therewith and the user designated time period and for selectively blocking outgoing calls to the at least one user designated number in the call block list of the designated call type during the selected time period during the day responsive to the at least one user designated number and the call type indication, the at least one user designated call type associated therewith and the user designated time period, wherein the call blocking logic module blocks incoming calls based upon a code in a presentation indicator field of an incoming call.

12. The wireless telephone of claim 11, wherein the call blocking logic module further provides the ability to activate blocking of all incoming calls to the wireless telephone.

13. The wireless telephone of claim 11, wherein the call blocking logic module further provides the ability to activate blocking of all outgoing calls from the wireless telephone.

14. The wireless telephone of claim 11, wherein the call blocking logic module enables a user to store a received call number as the at least one user designated number.

15. The wireless telephone of claim 11, wherein the call blocking logic module enables a user to enter a number to store as the at least one user designated number.

16. The wireless telephone of claim 11, wherein the call blocking logic module blocks incoming calls having a caller ID of the incoming blocked from the wireless telephone.

17. The wireless telephone of claim 11, wherein the at least one user designated number of the call block list is password protected.

18. The wireless telephone of claim 17, wherein the call blocking logic module further enables information associated with the at least one user designated number to be changed responsive to entry of the password.

19. A method for selectively blocking calls associated with a wireless telephone connected to a wireless communications network, comprising the steps of:

defining a call block list including at least one user designated number and an associated call type indication indicating a text message or a voice call at the wireless telephone within the wireless telephone wherein the step of defining further comprises the step of downloading the at least one telephone number to the call blocking from a remote location;

selectively blocking incoming calls at the wireless telephone from the at least one user designated number of a selected call type based upon a code in a presentation indicator field of an incoming call responsive to the at least one user designated number in the call block list and the call type indication associated therewith, the call type indication enabling blocking of either one of or each of a text message and a voice call; and selectively blocking outgoing calls from the wireless telephone to the at least one user designate number of the designated call type, responsive to the at least one user designated number and the call type indication enabling blocking of either one of or each of a text message and a voice call.

20. The method of claim 19, wherein the step of defining further comprises the step of defining all incoming calls as the at least one user designated call.

21. The method of claim 19, wherein the step of selectively blocking further comprises the step of selectively blocking all outgoing calls to the at least one user designated number.

22. The method of claim 19, wherein the step of defining further comprises the step of designating a call type associated with the at least one user designated number.

23. The method of claim 22, wherein the step of selectively blocking further comprises the step of selectively blocking incoming calls to the wireless telephone over the wireless telephone network responsive to the at least one user designated number in the call block list and the at least one user designated call type associated therewith.

24. The method of claim 19, wherein the step of defining further comprises the step of designating a time period associated with the at least one user designated number, the user designated time period defining a selected period time the at least one designated number is selectively blocked.

25. The method of claim 24, wherein the step of selectively blocking further comprises the step of selectively blocking incoming calls to the wireless telephone over the wireless communications network responsive to the at least one user designated number in the call block list and the user designated time period.

26. The method of claim 19, wherein the step of defining further comprises the step of storing a received call number as the at least one user designated number.

27. The method of claim 19, wherein the step of defining further comprises the step of entering a number to store as the at least one user designated number.

28. The method of claim 19, wherein the step of selectively blocking further includes the step of blocking incoming calls having a caller ID of the incoming call blocked from the wireless telephone.

29. The method of claim 19, further including the step of protecting the defined call block list using a password.

* * * * *